United States Patent
Beck et al.

[11] 3,794,809
[45] Feb. 26, 1974

[54] VEHICLE WINDSHIELD

[75] Inventors: Jerry G. Beck, Southfield; Richard T. Dickason, Birmingham; Donald J. Ray, Southgate, all of Mich.

[73] Assignee: Ford Motor Company, Dearborn, Mich.

[22] Filed: Dec. 29, 1972

[21] Appl. No.: 316,322

[52] U.S. Cl............... 219/203, 219/522, 219/538, 219/543, 219/544
[51] Int. Cl............................................ B60l 1/02
[58] Field of Search... 219/203, 522, 543, 544, 538; 338/254, 256–258, 306–308; 244/134 R, 134 D

[56] References Cited
UNITED STATES PATENTS

| | | | |
|---|---|---|---|
| 2,878,357 | 3/1959 | Thomson et al. | 219/203 x |
| 3,180,781 | 4/1965 | Ryan et al. | 219/203 x |
| 3,366,777 | 1/1968 | Brittan et al. | 219/203 x |

*Primary Examiner*—C. L. Albritton
*Attorney, Agent, or Firm*—William E. Johnson; Keith L. Zerschling

[57] ABSTRACT

A vehicle windshield is disclosed which is constructed of an inner and an outer glass lite. These lites have first and second laminating interlayers therebetween. A transparent, electrically conductive material is disposed between the first and the second laminating interlayers. The conductive coating on the electrically conductive material is spaced inwardly from the edges of the first and the second glass lites around the entire perimeter of the windshield an amount sufficient to permit the windshield to be hermetically sealed during its manufacture.

8 Claims, 5 Drawing Figures

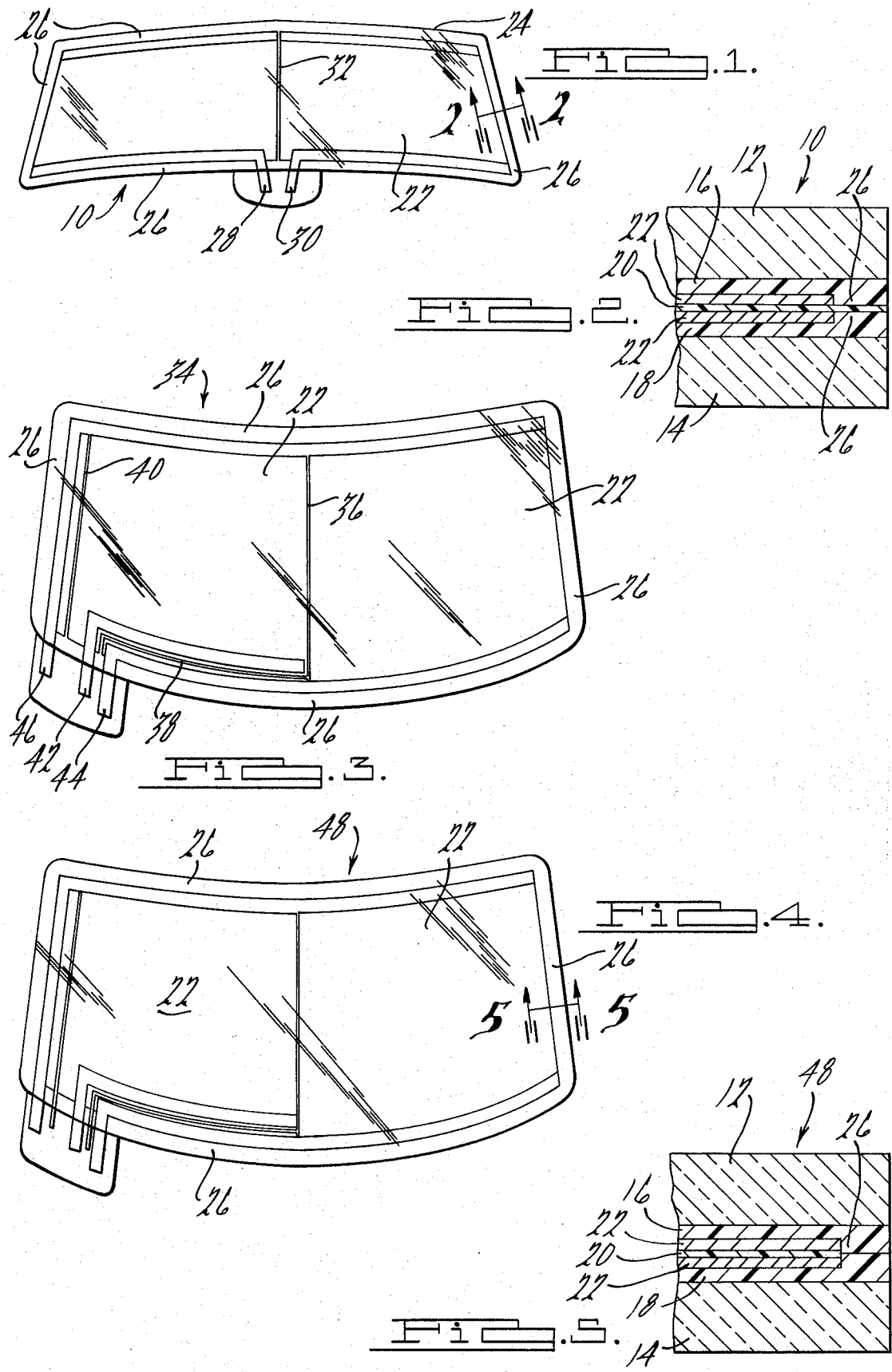

VEHICLE WINDSHIELD

BACKGROUND OF THE INVENTION

Present day technology teaches the defrosting or defogging of vehicle windshields by the utilization of a flow of warm air over the interior portion of the windshield. Thus before the moving air can be effective in defogging or deicing a windshield, it must be heated. The heating of the air, of course, requires the vehicle's engine to become heated so that it may supply the heat in a heat exchange device to the air which is to be blown over the windshield. The defrosting or defogging of a windshield in this manner occurs at first in the area where the moving stream of heated air is applied to the windshield and then progresses from that vicinity outwardly as the defrosting or defogging operation takes place.

Recently, electrically heatable interlayers have been proposed for utilization in defrosting or defogging. Such an interlayer is laminated between a pair of glass lites and it can have power supplied to it immediately upon the operation of the vehicle. Also with such a windshield, the defrosting or defogging occurs over the entire area of the windshield rather than starting at one zone and progressing from there on out. Generally interlayers for such conductive windshields comprise a suitable carrier with a thin metallic film thereon.

In attempting to laminate such interlayers, difficulties were encountered in trying to seal the windshield so that no foreign materials would penetrate the laminated structure and cause adverse reactions therewithin. Oil from the autoclaving operation necessary to cure the laminated structure also penetrated into some of the laminated windshield structures.

SUMMARY OF THE INVENTION

This invention is directed to a windshield for a vehicle and, more particularly, to an improved windshield for a vehicle wherein an electrically conductive material is included within the interior of the windshield for the purpose of heating it to defrost or defog it.

In accordance with the teachings of this invention, a windshield for a vehicle has an outer glass lite and an inner glass lite and an electrically conductive material for heating these two lites disposed therebetween. The structure also includes a first laminating interlayer adjacent the outer lite and a second laminating interlayer adjacent the inter lite. The transparent, electrically conductive material is disposed and laminated between the first and the second laminating interlayers. The conductive coating on the electrically conductive material is spaced inwardly from the edges of the first and the second glass lites around the entire perimeter of the windshield in an amount sufficient to permit the windshield to be hermetically sealed during its manufacture. In general, the conductive coating on the electrical conductive material is spaced inwardly at least ⅛ of an inch about the entire perimeter of the windshield. The entire carrier upon which the conductive coating is placed may, if desired, be set back the required amount or the coating on the carrier may be removed for the required amount.

BRIEF DESCRIPTION OF THE DRAWINGS

FIG. 1 is a front elevation view of a windshield constructed in accordance with the teachings of this invention.

FIG. 2 is a cross section taken along line 2—2 of FIG. 1 showing the cross sectional nature of the laminated structure of that Figure.

FIG. 3 is a front elevation view of another embodiment of the windshield of this invention.

FIG. 4 is a front elevation view of another embodiment of the windshield of this invention.

FIG. 5 is a cross section view taken along line 5—5 of FIG. 4 showing greater details of the laminated construction of that Figure.

DESCRIPTION OF THE PREFERRED EMBODIMENT

In FIG. 1 there is shown an embodiment of a windshield formed in accordance with the teachings of this invention and generally identified by the numeral 10. As best seen in FIG. 2 the windshield is formed from an outer glass lite 12 and an inner glass lite 14. A first laminating interlayer 16 is adjacent the outer lite and a second laminating interlayer 18 is adjacent the inner lite. These interlayers may be formed of a material such as polyvinylbutryl. Disposed between the first and the second laminating interlayers is a carrier layer 20 on both sides of which is a conductive metallic coating 22. The construction of the carrier and coating thereon is similar to that shown in Canadian Patent No. 844,570. The size of the conductive coating and carrier are exaggerated in FIG. 2 for the sake of clarity. The coatings are of such a nature that they only slightly reduce the transmission of light through the windshield but yet are sufficient to carry the current necessary to develop sufficient heat within the interior of the windshield to either defog or deice it.

As is best seen in FIG. 1, the conductive coating 22 is set back from the entire perimeter 24 of the windshield 10 by a space 26. As seen in FIG. 2, the space 26 is filled by both the first and the second laminating interlayers. As is also seen in FIG. 1, electrical terminal 28 and 30 are provided to connect two zones of the windshield separated by an isolation line 32 to a suitable power source such as the electrical system of the vehicle.

The entire structure 10 may be formed in the following manner. The first glass lite 12 is laid on a suitable fixture followed by the application of the first laminating interlayer 16, the carrier layer 20 with its conductive coatings thereon, the second laminating interlayer 18 and then the second glass lite 14. The carrier layer is adjusted when it is applied to the assembly in such a manner that the proper spacing 26 is achieved about the entire perimeter of the construction. Excess air is squeezed out of the structure by passing the assembly through a deair and tacking machine. Thereafter, the assembly is placed on a fixture and it is positioned in an autoclave. In the autoclave, heat and pressure are applied by an oil media to cure the polyvinyl chloride resin used as the first and the second laminating interlayers thereby to form the entire structure into a laminated unit. This finished unit is hermetically sealed to the penetration thereof by outside substances as the metallic coating on the carrier is spaced inwardly from the perimeter of the glass.

In FIG. 3 there is seen a second embodiment of a windshield constructed in accordance with the teachings of this invention and generally identified by the numeral 34. This windshield construction is similar to that shown in FIG. 1 in all respects including the utilization of the space 26 between the perimeter of the glass lites and the conductive coating 22 on the carrier 20. The windshield 34 differs from the windshield 10 in that three isolation lines 36, 38 and 40 divide the conductive material 22 into separate zones. A first electrical terminal 42 is connected to the first zone and runs across the length thereof while a second terminal 44 is connected to a second zone and runs across the length thereof. A common terminal 46 uses the third zone of the material so that is may run up and across the top of the other two zones of material thereby providing a common terminal for the other zones.

A third embodiment of a windshield constructed in accordance with the teachings of this invention is shown in FIG. 4 and is generally identified by the numeral 48. In this embodiment the outer glass lite 12 and inter glass lite 14 are the same and so are the first and the second laminating interlayers 16 and 18. In order to provide the space 26, however, the carrier 20 for the conductive material 22 is cut back the required amount in the area around the entire perimeter of the windshield. This permits the two polyvinyl chloride interlayers 16 and 18 to bond together and form the hermetic seal for the windshield. The connections to the conductive material 22 in the windshield 48 are made in the same manner as the connections are made to the windshield 34 of FIG. 3.

There has been shown herein a windshield construction for utilization with an electrically conductive interlayer. Many modifications of this structure will be apparent to those skilled in the art in view of the teachings of this invention. It is intended that all such modifications which fall within the true spirit and scope of this invention be included within the terms of the appended claims.

We claim:

1. In a windshield for a motor vehicle having an outer glass lite and an inner glass lite, wherein the windshield can support between the two glass lites a transparent material having an electrically conductive coating thereon for heating the two glass lites, the improvement comprising:
   a first laminating interlayer adjacent the outer lite;
   a second laminating interlayer adjacent the inner lite; and
   a transparent material having an electrically conductive coating thereon disposed between the first and the second laminating interlayers, the electrically conductive coating on the transparent material being spaced inwardly from the edges of the first and the second glass lites around the perimeter of the windshield an amount sufficient to permit the windshield to be hermetically sealed during its manufacture.

2. The improved windshield of claim 1 wherein: the conductive coating of the transparent material is spaced inwardly at least one-eighth of an inch from the entire perimeter of the windshield.

3. In a windshield for a motor vehicle having an outer glass lite and an inner glass lite, wherein the windshield can support between the two glass lites a transparent material having an electrically conductive coating thereon for heating the two glass lites, the improvement comprising:
   a first laminating interlayer generally the same size as and adjacent the outer lite;
   a second laminating interlayer generally the same size as and adjacent the inner lite; and
   a transparent, electrically conductive material formed by a transparent support layer with an electrically conductive coating on the transparent layer,
   the electrically conductive coating on the transparent support layer being spaced inwardly from the edges of the first and the second glass lites around the entire perimeter of the windshield an amount sufficient to permit the windshield to be hermetically sealed during its manufacture.

4. The improved windshield of claim 3 wherein: the electrically conductive coating is spaced inwardly at least one-eighth inch from the entire perimeter of the windshield.

5. The improved windshield of claim 3 wherein: the transparent layer extends to the edges of the first and the second lites.

6. The improved windshield of claim 3 wherein: the transparent support layer is the same size as the electrically conductive coating thereon.

7. The improved windshield of claim 3 wherein: the electrically conductive coating on the transparent support is divided into at least two independent and distinct zones to which electrical connection can be made.

8. The improved windshield of claim 3 wherein: the electrically conductive coating on the transparent support is divided into at least three independent and distinct zones to which electrical connection can be made, two of the zones having a single power electrical connection and the third zone having a common connection also connected to the other two zones.

* * * * *